US011263332B2

(12) United States Patent
Fredrickson et al.

(10) Patent No.: US 11,263,332 B2
(45) Date of Patent: Mar. 1, 2022

(54) METHODS TO DISCOURAGE UNAUTHORIZED REGISTER ACCESS

(71) Applicant: International Business Machines Corporation, Armonk, NY (US)

(72) Inventors: Mark Fredrickson, Rochester, MN (US); Chad Albertson, Rochester, MN (US); Scott D. Frei, Rochester, MN (US); David G. Wheeler, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 316 days.

(21) Appl. No.: 16/050,258

(22) Filed: Jul. 31, 2018

(65) Prior Publication Data

US 2020/0042730 A1    Feb. 6, 2020

(51) Int. Cl.
*G06F 21/62*      (2013.01)
*G06F 21/54*      (2013.01)

(52) U.S. Cl.
CPC .......... *G06F 21/6218* (2013.01); *G06F 21/54* (2013.01)

(58) Field of Classification Search
CPC ............. G06F 21/6218; G06F 21/6227; G06F 21/6254; G06F 21/54
USPC ......................................................... 726/27
See application file for complete search history.

(56) References Cited

U.S. PATENT DOCUMENTS

| 3,772,574 A | 11/1973 | Hughes |
| 5,377,343 A | 12/1994 | Yaezawa |
| 5,451,934 A | 9/1995 | Dawson et al. |
| 6,138,240 A | 10/2000 | Tran et al. |
| 6,321,201 B1* | 11/2001 | Dahl ........................ H04L 9/088 705/51 |
| 7,043,616 B1* | 5/2006 | McGrath ............. G06F 9/30101 711/163 |
| 7,380,140 B1* | 5/2008 | Weissman ............. G06F 21/575 709/213 |
| 7,540,026 B1* | 5/2009 | Szor .................... G06F 12/1425 711/163 |
| 8,528,080 B2 | 9/2013 | McCorkendale et al. |
| 9,015,075 B2 | 4/2015 | Hughes et al. |

(Continued)

FOREIGN PATENT DOCUMENTS

| EP | 0674318 A1 | 9/1995 |
| FR | 2483103 A1 | 11/1981 |

*Primary Examiner* — Saleh Najjar
*Assistant Examiner* — Peiliang Pan
(74) *Attorney, Agent, or Firm* — Scully, Scott, Murphy & Presser, P.C.

(57) ABSTRACT

A computer system, processor, and method for processing information is disclosed that includes watching logical operations to detect unauthorized attempts to access a register, and taking evasive action in response to detecting unauthorized attempts to access the register. In an embodiment, the register is a hidden, secret, restricted, or undocumented register, and the method further includes, in response to unauthorized attempts to access the secret register, locking the contents of the secret register. The evasive action may include one or more of interrupting the operations of the processor; causing the processor to shut-down, malfunction, lock, self-destruct; no longer providing read or write permission or access to the register; releasing data disguised to look like the real register data while not releasing the real data; and combinations thereof.

18 Claims, 7 Drawing Sheets

(56) References Cited

U.S. PATENT DOCUMENTS

| | | | |
|---|---|---|---|
| 9,317,452 B1* | 4/2016 | Forschmiedt | G06F 21/53 |
| 9,489,516 B1* | 11/2016 | Lu | G06F 21/53 |
| 2001/0047435 A1* | 11/2001 | Dove | G09G 5/14 |
| | | | 719/310 |
| 2003/0167400 A1* | 9/2003 | Coburn | G06F 9/468 |
| | | | 713/193 |
| 2005/0081127 A1* | 4/2005 | Rowlands | G06F 11/0784 |
| | | | 714/56 |
| 2006/0075251 A1* | 4/2006 | Correl | H04L 63/105 |
| | | | 713/182 |
| 2006/0136751 A1* | 6/2006 | Bonaccio | G06F 21/6245 |
| | | | 713/194 |
| 2006/0143131 A1* | 6/2006 | Baratti | G06F 21/6245 |
| | | | 705/57 |
| 2009/0024647 A1* | 1/2009 | Hein | G06F 16/25 |
| 2009/0276561 A1* | 11/2009 | Pekny | G06F 12/1458 |
| | | | 711/103 |
| 2010/0017879 A1* | 1/2010 | Kuegler | G06F 21/14 |
| | | | 726/23 |
| 2010/0077483 A1* | 3/2010 | Stolfo | H04L 63/1466 |
| | | | 726/24 |
| 2010/0107249 A1* | 4/2010 | Krig | G06F 21/57 |
| | | | 726/22 |
| 2011/0167474 A1 | 7/2011 | Sinha et al. | |
| 2011/0239001 A1* | 9/2011 | McCormack | G06F 21/55 |
| | | | 713/189 |
| 2012/0084866 A1* | 4/2012 | Stolfo | H04L 63/1416 |
| | | | 726/25 |
| 2013/0254598 A1* | 9/2013 | Yamashita | G06F 11/3041 |
| | | | 714/55 |
| 2013/0263226 A1* | 10/2013 | Sudia | G06F 21/60 |
| | | | 726/4 |
| 2015/0121529 A1* | 4/2015 | Quinlan | H04W 12/128 |
| | | | 726/23 |
| 2015/0312254 A1* | 10/2015 | Schmitt | H04L 63/0823 |
| | | | 726/5 |
| 2015/0326588 A1* | 11/2015 | Vissamsetty | H04L 63/145 |
| | | | 726/23 |
| 2016/0203325 A1* | 7/2016 | Eppensteiner | G06F 21/55 |
| | | | 726/20 |
| 2017/0083321 A1* | 3/2017 | Burger | G06F 9/528 |
| 2018/0196956 A1* | 7/2018 | Mishra | G06F 21/79 |
| 2019/0132288 A1* | 5/2019 | Li | H04L 63/0245 |
| 2019/0361815 A1* | 11/2019 | Tsirkin | G06F 12/1009 |
| 2020/0042730 A1* | 2/2020 | Fredrickson | G06F 21/54 |

* cited by examiner

| Address | Contents |
|---|---|
| x000nnnnD | |
| x000nnnnC | |
| x000nnnnB | |
| x000nnnnA | |
| x000nnnn9 | |
| x000nnnn8 | |
| x000nnnn7 | |
| x000nnnn6 | Dummy register |
| x000nnnn5 | Hidden (secret) register |
| x000nnnn4 | Dummy register |
| x000nnnn3 | |
| x000nnnn2 | |
| x000nnnn1 | |
| x000nnnn0 | |

| | |
|---|---|
| x00000003 | |
| x00000002 | |
| x00000001 | |
| x00000000 | |

| Address | Contents |
|---|---|
| x000nnnnD | |
| x000nnnnC | |
| x000nnnnB | |
| x000nnnnA | (1) Write x'F00BAR into this reg |
| x000nnnn9 | |
| x000nnnn8 | |
| x000nnnn7 | (3) Write x'DEADBEEF into this reg |
| x000nnnn6 | Dummy register |
| x000nnnn5 | Hidden (secret) register |
| x000nnnn4 | Dummy register |
| x000nnnn3 | |
| x000nnnn2 | (2) Read this reg |
| x000nnnn1 | |
| x000nnnn0 | |
| | |
| x00000003 | |
| x00000002 | |

Fig. 7

Fig. 8

METHODS TO DISCOURAGE UNAUTHORIZED REGISTER ACCESS

BACKGROUND OF INVENTION

The present invention generally relates to information handling and data processing systems, processors, and memory systems, and more specifically to discouraging or restricting unauthorized register file access.

With recent advancement of information technology and wide use of the Internet to store and process information, more and more demands are placed on the acquisition, processing, storage and dissemination of information by computing systems. Computing systems are being developed to increase the speed at which the computers are able to execute increasingly complex applications for business, personal use, and entertainment. Overall computer system performance is affected by each of the key elements of the computer structure, including the performance/structure of the processors, any memory caches, input/output (I/O) subsystems, efficiency of the memory control functions, the performance of the memory devices and systems, and any associated memory interface elements, and the type and structure of the memory interconnect interfaces.

Modern computer systems typically contain several integrated circuits (ICs), including a processor which may be used to process information in the computer system. The information processed by a processor may include computer instructions that are executed by the processor as well as data, which is manipulated by the processor using the computer instructions. The computer instructions and data are typically stored in a main memory in the computer system.

Keeping unauthorized users and/or rogue software from accessing information handling and data processing systems is becoming increasingly important and difficult to achieve. In one situation, a user may be authorized to have access to an information handling system, a computer system, a processor, and/or register files, but may not be authorized to have complete access to the complete system and/or all the register files. Accordingly, while the user may be authorized for access to portions of the system, the user is not authorized to access the entire system and is not authorized to access certain register files. The user, however, may attempt to access and obtain the contents of register files, including, for example, for reverse engineering. Protecting certain portions of systems, e.g., certain register files, from being accessed by a user who is authorized to access other portions of the system or register files and who may own the system may be difficult.

SUMMARY

The summary of the disclosure is given to aid understanding of a computer system, computer architectural structure, processor, and method of restricting unauthorized access to such systems, including unauthorized access to register files, and not with an intent to limit the disclosure or the invention. The present disclosure is directed to a person of ordinary skill in the art. It should be understood that various aspects and features of the disclosure may advantageously be used separately in some instances, or in combination with other aspects and features of the disclosure in other instances. Accordingly, variations and modifications may be made to the computer system, the architectural structure, processor, register files, and their method of operation to achieve different effects.

Aspects of the present disclosure provide in one or more embodiments a method of processing data in a processor that includes watching logical operations to detect unauthorized attempts to access a register, and taking evasive action in response to detecting unauthorized attempts to access a register. In an embodiment, the register is a hidden, secret, restricted, or undocumented register, and the method further includes, in response to unauthorized attempts to access the register, locking the contents of the register. In one or more embodiments, the evasive action may include at least one of the group consisting of interrupting the operations of the processor; causing the processor to shut-down, malfunction, lock, self-destruct; no longer providing read or write permission or access to the register; releasing data disguised to look like the real register data while not releasing the real data; and combinations thereof. In an aspect, a flag bit is set in response to detecting unauthorized access to the register.

The method in an embodiment is preferably performed in hardware. In an aspect, the method further includes watching logical operations to detect a combination, and in response to detecting a combination releasing the contents of the register. The combination in an aspect includes an ordered sequence of write and/or read operations. In a further aspect, the method includes not releasing the contents of the register in response to the combination where logical operations detected unauthorized access to one or more registers. Detecting unauthorized access to the register file in an embodiment includes detecting at least one of the group consisting of watching for sequential memory access attempts, watching for attempts to access one or more registers using the wrong access mode or in the wrong sequence, watching for attempts to access one or more undocumented registers, and combinations thereof.

In a further embodiment a method of processing data in a logical system is disclosed that includes providing a secret, hidden, restricted or undocumented register; providing a dummy register; determining whether the dummy register is accessed; and triggering action in response to the dummy register being accessed. In an aspect, the triggering action includes at least one of the group consisting of interrupting the operations of the processor; causing the processor to shut-down, malfunction, lock, self-destruct; locking the contents of the register, no longer providing read or write permission or access to the register; releasing data disguised to look like the real register data while not releasing the real data; and combinations thereof. In an aspect, the method further includes setting a flag bit in response to accessing the dummy register.

In a further embodiment, a computer system for processing information is disclosed where, the computer system includes at least one processor having one or more register files, wherein at least one of the registers is a secret register not intended to be accessed by unauthorized users; and the at least one processor is configured and adapted to detect whether unauthorized access to the secret register is attempted; and to take evasive action in response to detecting attempted unauthorized access to the secret register. In an aspect, taking evasive action includes at least one of the group consisting of interrupting the operations of the processor; causing the processor to shut-down, malfunction, lock, or self-destruct; locking the contents of the secret register; no longer providing read or write permission or access to the secret register; releasing data disguised to look like the real data in the secret register while not releasing the real data from the secret register; and combinations thereof. In an aspect, detecting unauthorized access to the secret register includes detecting at least one of the group consisting of watching for sequential memory access attempts, watching for attempts to access one or more registers using the wrong access mode or in the wrong sequence, watching for attempts to access one or more undocumented registers, and combinations thereof.

The computer system in one or more embodiments further includes the processor configured and adapted to watch logical operations to detect a combination that includes an ordered sequence of operations; and to release the contents of the secret register in response to detecting the combination, but not releasing the contents of the secret register in response to the combination where logical operations detected unauthorized access to the secret register. In one or more aspects, the computer system, and preferably the processor, has one or more dummy registers and is configured and adapted to determine when one or more of the dummy registers is accessed, and to release data disguised to look like real data in the secret register while not releasing the real data from the secret register in response to accessing the dummy register.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

The various aspects, features and embodiments of the information handling system, computer system, computer architectural structure, processor, register files, and their method of operation will be better understood when read in conjunction with the figures provided. Embodiments are provided in the figures for the purpose of illustrating aspects, features and/or various embodiments of the computer system, computer architectural structure, processor, register files, and their method of operation, but the claims should not be limited to the precise arrangement, structures, features, aspects, embodiments or devices shown, and the arrangements, structures, subassemblies, features, aspects, methods, processes, embodiments, methods, and devices shown may be used singularly or in combination with other arrangements, structures, subassemblies, features, aspects, embodiments, methods and devices.

DETAILED DESCRIPTION

The following description is made for illustrating the general principles of the invention and is not meant to limit the inventive concepts claimed herein. In the following detailed description, numerous details are set forth in order to provide an understanding of the information handling system, computer system, computer architectural structure, processor, memory, queues, or register files, and their method of operation, however, it will be understood by those skilled in the art that different and numerous embodiments of the computer system, computer architectural structure, processor, queues, or register files, and their method of operation may be practiced without those specific details, and the claims and invention should not be limited to the embodiments, subassemblies, features, processes, methods, aspects, features or details specifically described and shown herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc. It must also be noted that, as used in the specification and the appended claims, the singular forms "a," "an" and "the" include plural referents unless otherwise specified.

The following discussion omits or only briefly describes conventional features of information processing systems, including processors, microprocessor systems, memory systems, and system architecture, which are apparent to those skilled in the art. It is assumed that those skilled in the art are familiar with the general architecture of computer systems, memory systems, processors, and in particular with register files. It may be noted that a numbered element is numbered according to the figure in which the element is introduced, and is typically referred to by that number throughout succeeding figures.

Figure 1:
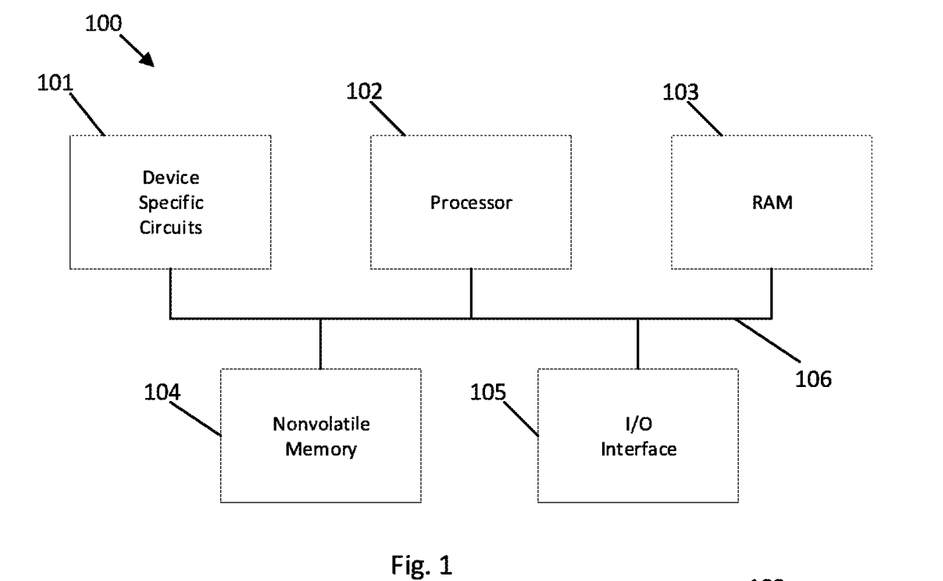
FIG. 1 depicts a general computing or data processing system in accordance with one embodiment.

A computing or data processing system 100 suitable for storing and/or executing program code may take many forms and in one embodiment may include at least one processor 102, which may be or be part of a controller, coupled directly or indirectly to memory devices or elements and input/output devices through a system bus 106, as shown in FIG. 1. Computing system 100 in FIG. 1 is shown with a processor 102, Random Access Memory (RAM) 103, nonvolatile memory 104, device specific circuits 101, and I/O interface 105. Alternatively, or additionally, the RAM 103 and/or nonvolatile memory 104 may be contained in the processor 102 as could the device specific circuits 101 and I/O interface 105. The processor 102 may comprise, for example, an off-the-shelf microprocessor, custom processor, Field Programmable Gate Array (FPGA), Application Specific Integrated Circuit (ASIC), discrete logic, etc., or generally any device for executing instructions. The RAM 103 is typically used to hold variable data, stack data, executable instructions, etc., and may include Dynamic Random Access Memory or DRAM.

According to various approaches, the nonvolatile memory 104 may comprise any type of nonvolatile memory such as, but not limited to, Electrically Erasable Programmable Read Only Memory (EEPROM), flash Programmable Read Only Memory (PROM), battery backup RAM, hard disk drives, etc. The nonvolatile memory 104 is typically used to hold the executable firmware and any nonvolatile data containing programming instructions that can be executed to cause the processor 102 to perform certain functions.

In some embodiments, the I/O interface 105 may include a communication interface that allows the processor 102 to communicate with devices external to the controller.

Examples of the communication interface may comprise, but are not limited to, serial interfaces such as RS-232, USB (Universal Serial Bus), Small Computer Systems Interface (SCSI), RS-422 or a wireless communication interface such as Wi-Fi, Bluetooth, near-field communication (NFC) or other wireless interfaces. The computing system 100 may communicate with an external device via the communication interface 105 in any communication protocol such as Automation/Drive Interface (ADI).

Figure 2:
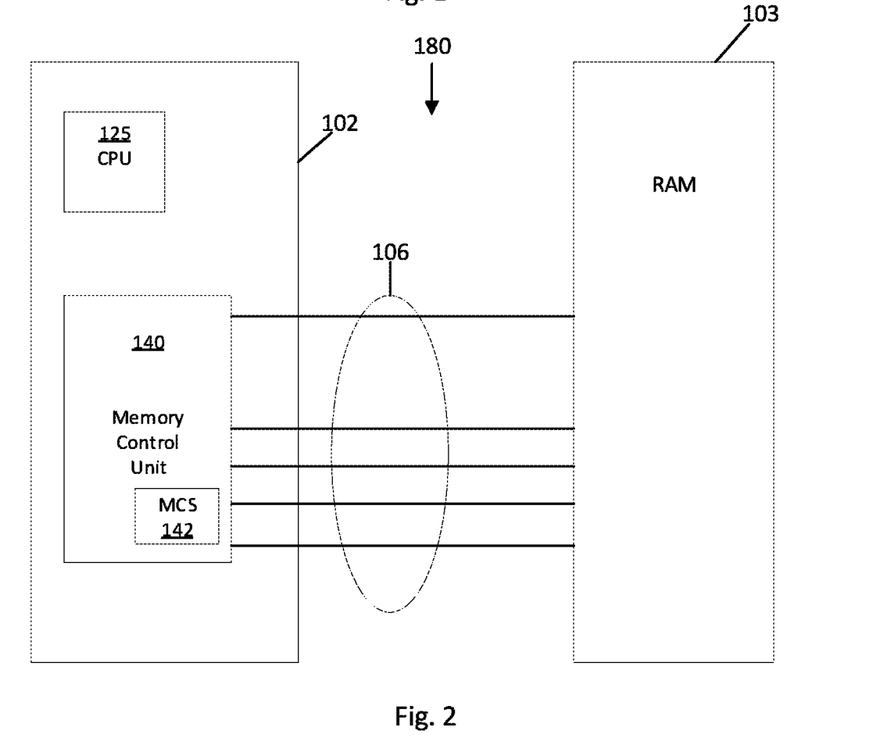
FIG. 2 depicts a processor and memory system according to one embodiment.

FIG. 2 depicts an exemplary processing system 180 that may be part of a larger computer system structure or network. The processing system 180 includes a control processor system or processor 102, which is a processing subsystem that includes at least one processor unit (CPU) or microprocessor 125 that may be configured to interface with a Memory Control Unit (MCU) 140. The processor or CPU 125 may be a module that processes read, write, and configuration requests from a system controller (not depicted). The processor 125 may be a multi-core processor. The MCU 140 may include a memory controller synchronous (MCS) 142, also referred to as a memory controller, that controls communication with one or more memory devices, e.g., DRAMs, (not shown in FIG. 2) in a memory subsystem 103. The MCU 140 and the MCS 142 may include one or more processing circuits, or processing may be performed by or in conjunction with the processor 125. The control processor system 102 communicates with the memory subsystem 103 through a communications bus 106.

Figure 3:
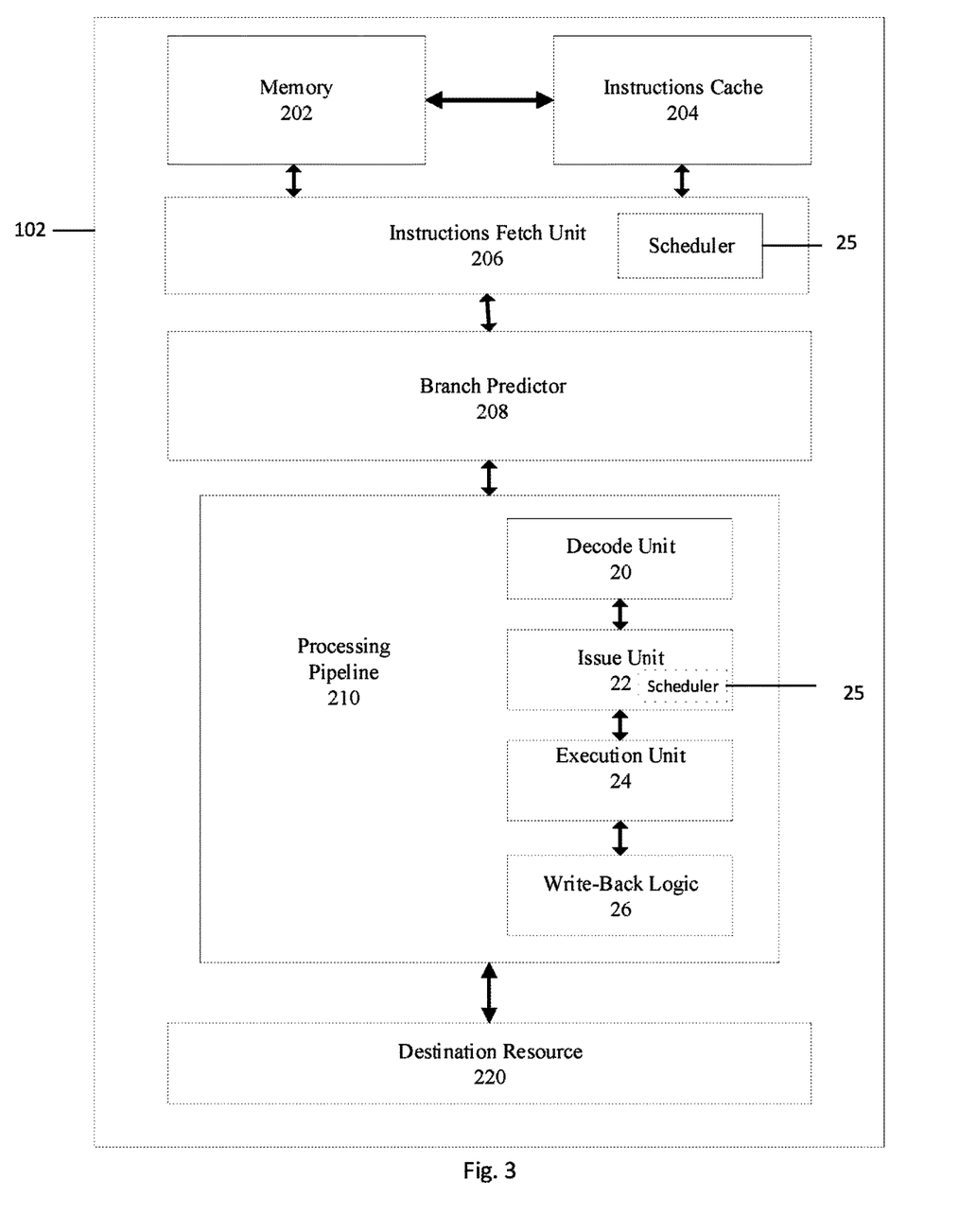
FIG. 3 depicts a block diagram of a processor in accordance with an embodiment.

FIG. 3 depicts a block diagram of a processor 102 according to an embodiment. The processor may be a pipelined processor configured to execute one or more streams of instructions or threads. A thread (also referred to as an instruction stream) comprises a sequence or collection of instructions that together perform a specific task. The threads may be instruction streams from different parts of the same program executing on the processor, or may be from different programs executing on the processor, or combinations thereof. The processor in one embodiment may be a multithreaded processor and may process threads concurrently.

The processor 102, according to one embodiment, may include a memory 202, an instruction cache 204, an instruction fetch unit 206, a branch predictor 208, and a processing pipeline 210. The processor 102 may be included within a computer processor or otherwise distributed within a computer system. Instructions and data can be stored in memory 202, and the instruction cache 204 may access instructions in memory 202 and store the instructions, e.g., the instructions of the various threads, to be fetched in cache memory. The memory 202 may include any type of volatile or nonvolatile memory, such as cache memory. The memory 202 and instruction cache 204 can include multiple cache levels. A data cache (not depicted) may also be included in the processor 102. The processor 102 preferably permits multiple threads to share the functional units of the microprocessor 102 (e.g., instruction fetch and decode units, caches, branch prediction units, and execution units) preferably in concurrent fashion.

In FIG. 3, a simplified example of the instruction fetch unit 206 and the processing pipeline 210 are depicted. In various embodiments, the processor 102 may include one or more processing pipelines 210 and instruction fetch units 206. In an embodiment, and for ease of discussion, the processing pipeline 210 includes a decode unit 20, an issue unit 22, an execution unit 24, and write-back logic 26. The instruction fetch unit 206 and/or the branch predictor 208 may also be part of the processing pipeline 210. The processing pipeline 210 may also include other features, such as error checking and handling logic, reorder buffer, one or more parallel paths through the processing pipeline 210, and other features now or hereafter known in the art. The pipeline may also be broken down and illustrated differently. While a forward path through the processor 102 is depicted in FIG. 3, other feedback and signaling paths may be included between elements of the processor 102.

The instruction fetch unit 206 fetches instructions from the instruction cache 204 according to an instruction address, for further processing by the decode unit 20. The decode unit 20 decodes instructions and passes the decoded instructions, portions of instructions, or other decoded data to the issue unit 22. The issue unit 22 analyzes the instructions or other data and transmits the decoded instructions, portions of instructions, or other data to one or more execution units in the execution unit 24 based on the analysis. The execution unit 24 executes the instructions. The execution unit 24 may include a plurality of execution units, such as, for example, Arithmetic Logic Units (ALUs) 25, fixed-point execution units, floating-point execution units, load/store execution units, and vector multimedia execution units, to name a few. In embodiments, registers (not shown) and different levels of data caches may be coupled to the execution unit 24. The scheduler 25 and instruction fetch unit 206 may also have registers (not shown) and/or different levels of caches (not shown) associated therewith. The write-back logic 26 writes results of instruction execution back to a destination resource 220. The destination resource 220 may be any type of resource, including registers, cache memory, other memory, I/O circuitry to communicate with other devices, other processing circuits, or any other type of destination for executed instructions or data.

Information handling and data processing systems, computer systems, processors, and/or digital logic systems often includes registers that may be read or written from software programs. Modern integrated circuit-based registers are usually implemented using static random access memory (SRAM) with multiple ports. Registers generally have dedicated read and write ports. Registers can be user-accessible registers, such as, for example, data registers, address registers, general purpose registers, status registers, and configuration registers. In an aspect, a register is a real or virtual data storage location that in an embodiment has an address in the memory map. In an example, a register file can be an array of processor registers in a central processing unit (CPU).

Some of these registers, or portions of the registers, e.g., register entries, may be undocumented, hidden, restricted, and/or "secret" registers, that have special purposes or functions that are not intended for general use. For example, these registers or portions thereof could be used to control access to special, privileged logic functions, or they could contain a secret payload such as an encryption key. Persons may know of the existence of these hidden, undocumented, restricted, and/or secret registers and may attempt unauthorized access to these hidden, undocumented, restricted, or secret registers. Additionally and/or alternatively, unauthorized or authorized persons may not know of their existence, but may search for them and/or otherwise attempt unauthorized access to these hidden, undocumented, restricted, and/or secret registers. For example, a person may be authorized to have access to the register files but certain files may be hidden, undocumented, restricted, secret, and/or unmapped. In an embodiment, the user may have access to the file, but should not be able to view the contents of the file. One purpose of restricting or preventing access to the register contents may be to prevent reverse engineering the system.

In an embodiment, address translation can be used to prevent access to unauthorized portions of the register files. One of the purposes of address translation in information handling systems, data processing systems, computer systems, processors, and/or digital logic systems is to make sure that program instructions only access memory for which they are authorized. This can include memory-mapped register access. Address translation, however, does not prevent programs from accessing hidden, secret, and/or undocumented registers that are within the authorized memory address range.

This disclosure describes several logic-level mechanisms that can be used, preferably in the hardware, to discourage, restrict, and/or prevent attempts to find and access registers, and in aspects, hidden, secret, restricted, and/or undocumented registers. Several techniques are described that discourage, restrict, and/or prevent unauthorized access to register files, and or portions thereof, more specifically, in an aspect, discourage, restrict, and/or prevent register access attempts by rogue software. This disclosure describes several logic-level mechanisms that can be used preferably in the hardware to prevent access to hidden, secret, restricted, and/or undocumented registers. In several embodiments, the protection mechanisms are based upon an unauthorized or rogue user not knowing a critical piece of information.

In an aspect, if access to undocumented spaces in the register address map is attempted, a flag bit can be set that indicates unauthorized access has been detected or is suspected. In an embodiment, hardware detects that software and/or unauthorized user is trying to access un-documented, hidden, restricted, or secret spaces in the register address map, and the hardware can set a flag bit indicating that rogue software and/or an unauthorized user has been detected. This flag bit can be used to trigger defense mechanisms as described below.

Unauthorized access and/or rogue software can be detected in a number of ways. For example, unauthorized or rogue software can be detected by watching for sequential memory access attempts, e.g., walking through memory. In another aspect, detecting unauthorized access and/or rogue software may include watching for attempts to access registers using the wrong access mode, e.g., attempting a read operation as opposed to a write operation. Detecting unauthorized access and/or rogue software may, in an embodiment, include watching for any attempt to access register addresses that are not documented. Detecting unauthorized access or rogue software in an aspect can include watching for memory access sequences that are not following a pre-specified sequence.

Figure 4:
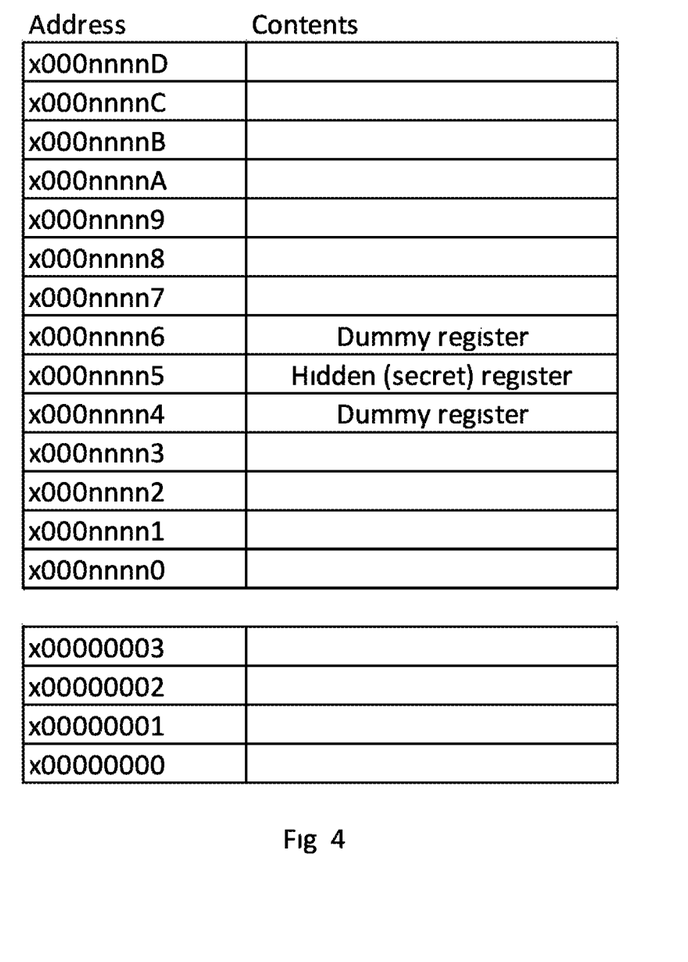
FIG. 4 depicts a register memory address map in accordance with an embodiment.

In an embodiment, undocumented or dummy registers (virtual or real) could be strategically placed around the secret register in the register address map. The undocumented or dummy registers in an embodiment could trigger bad consequences. FIG. 4 Illustrates a register address map showing dummy registers surrounding a secret, undocumented, restricted, and/or hidden register. If software or a user tries to access these dummy registers (using either read and/or write operations), in an embodiment, bad consequences could be triggered. In an embodiment, if the dummy register is accessed, the hardware could cause an interrupt, cause the chip or circuitry to shutdown, cause other parts of the chip or circuitry to malfunction, cause the chip or circuitry to self-destruct, cause parts of the chip or circuitry to be locked, including the secret register. For example, if unauthorized access and/or rogue software is detected, hardware can cause an interrupt in chip or circuitry operations so that the chip or circuitry, or parts thereof, will no longer perform read or write operations, or the chip or circuit can otherwise change its behavior.

In an embodiment, accessing one or more dummy register could trigger or alert the system and/or processor that rogue software and/or an unauthorized user is attempting to access hidden, secret, restricted, and/or undocumented registers. For example, in an aspect, the rogue software or unauthorized user may attempt sequential register accesses and/or access the dummy register. In an aspect, where the dummy register or registers are accessed, the secret, hidden, restricted, and/or undocumented register(s) could be locked so the contents of the secret, hidden, restricted and/or undocumented register cannot be read and/or released.

Figure 5:
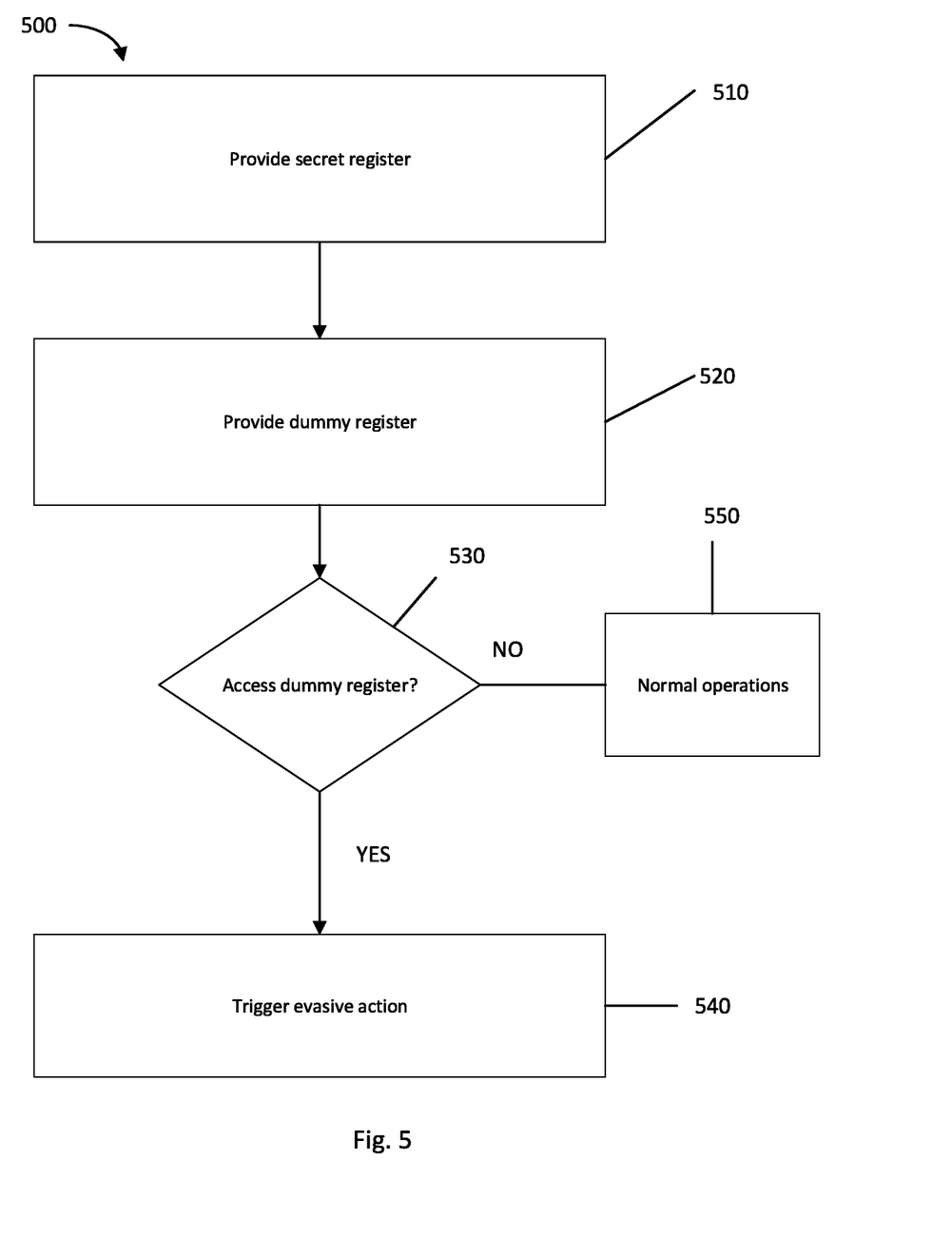
FIG. 5 depicts a flow chart of a method, according to an embodiment, of discouraging, restricting, and/or preventing unauthorized access to one or more register files.
Figure 6:
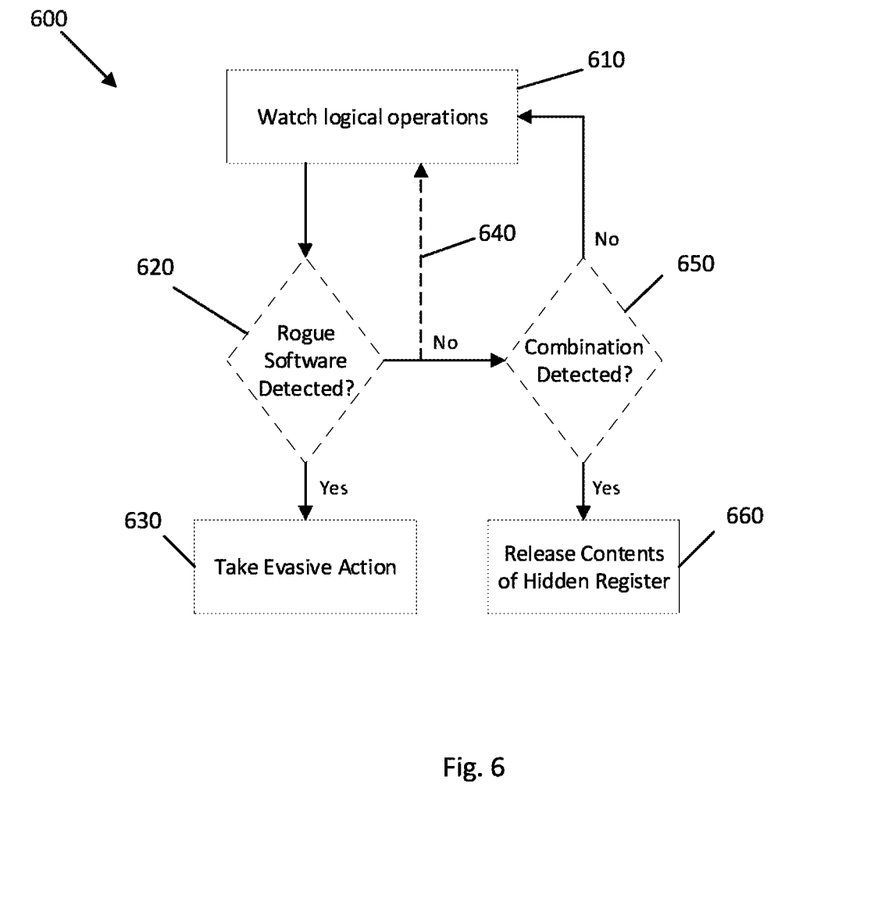
FIG. 6 depicts a flow chart of a method, according to an embodiment, of discouraging, restricting, and/or preventing unauthorized access to one or more register files.
Figure 8:
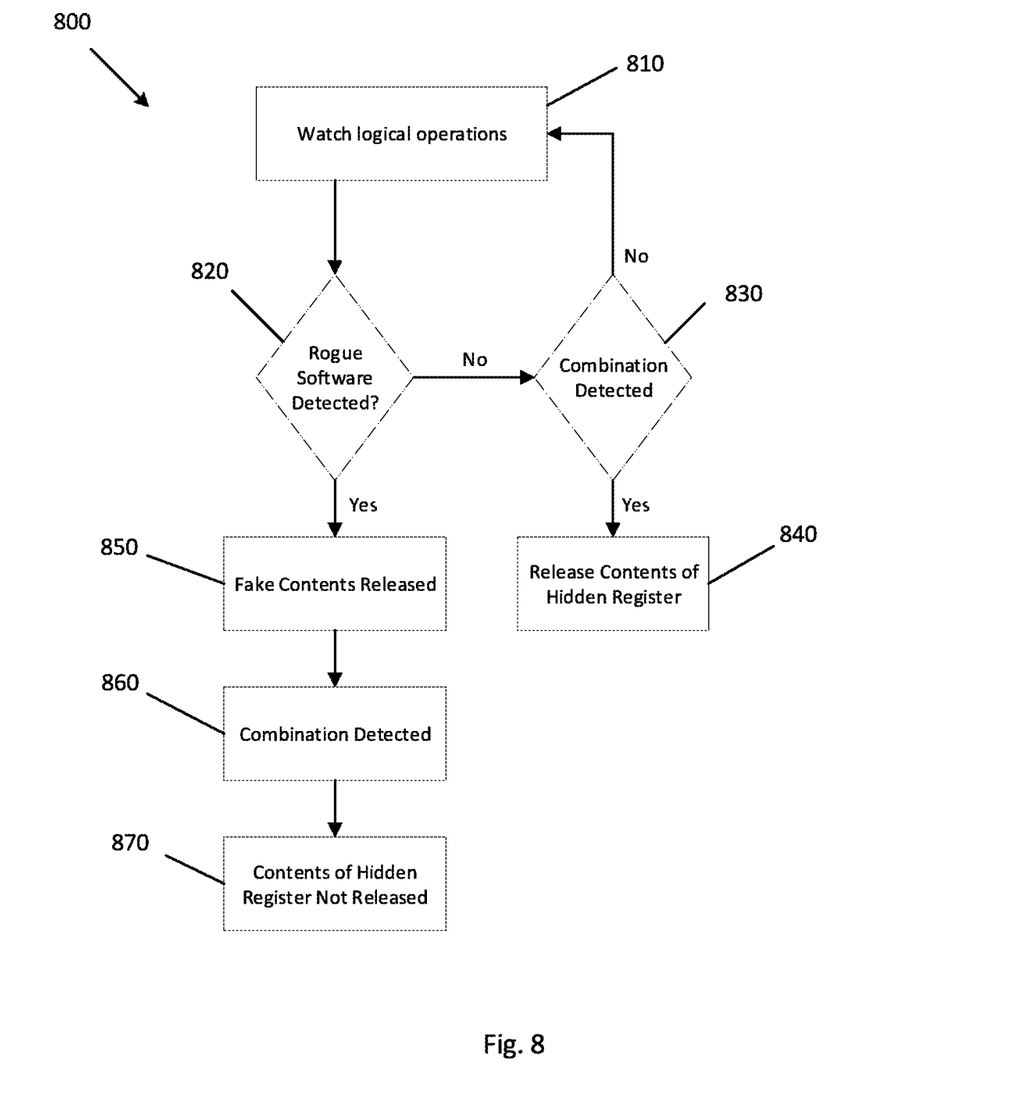
FIG. 8 depicts a flow chart of an embodiment of a method to discourage, restrict, and/or prevent unauthorized access to one or more register files.

FIGS. 5, 6, and 8 are exemplary flowcharts in accordance with embodiments each illustrating and describing a method of handling information in a computer system, and more specifically a method of discouraging, restricting, and/or preventing unauthorized access to register files. While the methods 500, 600, and 800 are described for the sake of convenience and not with an intent of limiting the disclosure as comprising a series and/or a number of steps, it is to be understood that each process does not need to be performed as a series of steps and/or the steps do not need to be performed in the order shown and described with respect to FIGS. 5, 6, and 8, but the process may be integrated and/or one or more steps may be performed together, simultaneously, or the steps may be performed in the order disclosed or in an alternate order.

A method 500 of handling instructions in a system, e.g., a processor, is illustrated in FIG. 5, and more specifically a method of discouraging, restricting, and/or preventing unauthorized access to register files. At 510, a register is configured and provided with a hidden, secret, restricted, and/or undocumented register file. At 520, a register is configured and provided with one or more dummy register files. In an embodiment, the one or more dummy register files are configured to protect the hidden, restricted, secret, and/or undocumented register files. For example, one or more dummy register files may be placed in a register memory address map, and in an embodiment are placed before, after, and/or in a manner to surround the hidden, undocumented, restricted, and/or secret register files.

At 530, it is determined whether access is made and/or attempted to be made to one or more of the dummy register files. If access is made or attempted to be made of one or more of the dummy registers (530: Yes), then at 540 evasive action may be undertaken. For example, at 540 the dummy register could cause an interrupt in the circuitry (chip), the circuitry (chip) to shut down, self-destruct, malfunction, and/or lock-up, including locking up the secret, hidden, restricted, and/or undocumented register file. In one embodiment, if the dummy register is accessed, it could release a fake payload. In this manner, the unauthorized user and/or rogue software may not know that it has been detected. For example, the fake payload could be random data, or data disguised to look real.

If at 530 no access of the dummy register files is attempted and/or made (530: No), then at 550 the system, processor, circuitry, and/or chip continues normal operations. If access to the secret, hidden, restricted, and/or undocumented file is attempted (Register file 5 in FIG. 4), and no access has been made or attempted of the one or more dummy files, in an embodiment, then the contents of the hidden, secret, restricted, and/or undocumented file may be disclosed/accessed (e.g., read and/or written).

In another embodiment, a method 600 of handling instructions in a system, e.g., a processor, is illustrated in FIG. 6, and more specifically a method of discouraging, restricting, and/or preventing unauthorized access to register files. In an aspect, at 610, logical operations are watched to detect unauthorized access or attempts at unauthorized access. At 620, the system determines whether rogue software and/or unauthorized access is detected and/or suspected. For example, logical operations can watch for sequential memory access attempts, attempts to access registers in the wrong manner or sequence, attempts to access register addresses that are not documented, attempts to access registers without proper passcodes, etc.

At 630, if rogue software and/or unauthorized access is detected (630: Yes), then the system can take evasive action. For example, the contents of the secret register could be locked, the circuitry (or chip) could cause an interrupt, the circuitry (or chip) could shut down, malfunction, work improperly, self-destruct, and/or otherwise change its behavior. If rogue software and/or unauthorized access is not detected or suspected (630: No), then the system can go back at 640 to watching logical operations. In a preferred embodiment process 600 is performed by hardware. In process 600, in an embodiment, should access to the secret or hidden register files be made, and no rogue software and/or an authorized access was detected or suspected, the hidden register is accessed, e.g., the contents of the hidden register could be written to, read, copied, and/or released.

In another embodiment, if it is determined that the secret register has been accessed in an unauthorized manner, the hardware could cause the register access to perform evasive action, such as, for example, some other function instead of the secret function. For example, the hardware could cause a rogue write operation to control some un-related logic function, or a rogue read operation could return a fake payload. The fake payload could be random data or could be real data unrelated to the secret function of the register. In this manner, if a rogue user or rogue software accesses the secret register, the rogue user or software will not have triggered the secret function, and in an embodiment will not know that it is a secret register. For example, in an embodiment, if access is made to the secret register after the system detects rogue software or unauthorized access attempts, the system could undergo these other actions without releasing or providing access to the contents of the register file.

Figure 7:
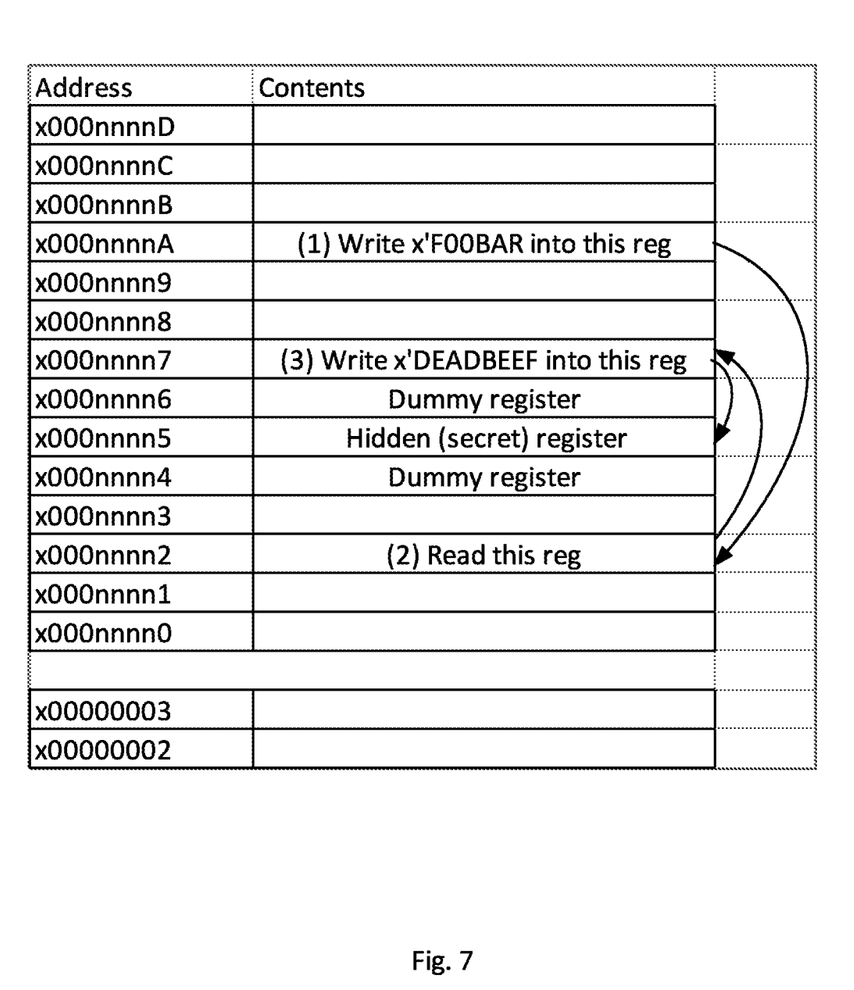
FIG. 7 depicts a register memory address map in accordance with an embodiment.

In a still further example, logic could be designed in such a way that a series of undocumented or documented registers need to be accessed in a certain order for the secret register to be unlocked. A logical combination lock could be implemented in many different ways. FIG. 7 is a block diagram for a very simple logical combination lock. In FIG. 7, a plurality of operations, e.g., three operations, need to be performed in order before access to the hidden (secret) register file will be granted. For example, in FIG. 7, three operations will need to be performed in an ordered sequence. First, as depicted in FIG. 7 a certain value will need to be written into register A. If the wrong value is written to register A, or a read operation of register A is attempted, the secret register will become locked, and/or other evasive techniques may be undertaken, e.g., causing circuit malfunction and/or releasing fake payload as described above. In the example of FIG. 7, a second operation, e.g., a read operation from register 2, needs to be undertaken some time after the required first operation. If the write to register A is undertaken but the read from register 2 is not undertaken in the proper sequence, then the secret register may be locked and/or other evasive actions may be undertaken as described above. The second operation in an embodiment may need to be the very next operation after the first operation, or there may be a random or predefined series of intermediary actions.

Next, as part of the combination of FIG. 7, a third action is required, e.g., a certain value be written to register 7. In the embodiment of FIG. 7, the combination of activities may be required to happen in the required order, and in an embodiment may be required to happen sequentially right after each other, or in another embodiment, may have a series of random actions in between the required steps. For example, the second action, the read from register 2 action may need to occur four random actions after the first action (write to Register A). The third action may need to occur a number of actions after the second action. In further embodiments, the combination can be changed or varied to provide different permissions and/or to release different data from the register file.

In an alternative embodiment of method 600, if at 620 rogue software (or attempted unauthorized access) is not detected (620: No), at 650 the system checks for a combination. If at 650 a combination is not detected (650: No), the system proceeds to 610 and 620 where it watches logical operations for rogue software. If at 650 unauthorized access and/or rogue software is not detected and the combination to access the register is detected (650: Yes), then at 660 the content of the hidden register is accessed, disclosed, read, and/or released.

A method according to another embodiment of handling instructions in a system, e.g., a processor, is illustrated in FIG. 8, and more specifically a method of discouraging, restricting, and/or preventing unauthorized access to register files. In an aspect, at 810 logical operations are watched, e.g., to determine whether unauthorized access or attempts at unauthorized access is being performed on the system. For example, at 820 it is determined whether rogue software, and/or unauthorized access is detected and/or suspected. If unauthorized access, attempted unauthorized access, and/or rogue software is not detected (810: No), then at 830 it is determined whether a combination is detected. If the combination is not detected at 830 (830: No), the system resets to 810 and watches logical operations. If at 830, the combination is detected (830: Yes) and the check at 820 is false (820: No), such that no unauthorized access has been attempted, then the contents of the hidden, secret, restricted, and/or undocumented file is released at 840. If, however, at 820 unauthorized access is detected or attempted, and/or rogue software is detected (820: Yes), then at 850 fake contents may be released and/or other evasive actions undertaken as discussed herein.

At 860, in an embodiment, if the register access combination is detected after unauthorized access has been attempted or performed, and/or after rogue software is detected, then the contents of the hidden, secret, restricted, and/or undocumented register file is locked and not released. In an aspect, after rogue software, or attempted unauthorized access has been detected, the combination can be reset, for example, by inserting a different combination or undergoing, for example, other actions. The secret combination could be hard-wired into the logic, or it could be programmable using some other secret function, or it could be unique for each chip by, for example, burning fuses when the chip or circuitry is manufactured.

Aspects of the present disclosure provide in one or more embodiments a method of processing data in a processor that includes watching logical operations to detect unauthorized attempts to access a register, and taking evasive action in response to detecting unauthorized attempts to access a register. In an embodiment the register is a hidden, secret, restricted, or undocumented register, and the method further includes, in response to unauthorized attempts to access the register, locking the contents of the register. In one or more embodiments the evasive action may include at least one of the group consisting of interrupting the operations of the processor; causing the processor to shut-down, malfunction, lock, self-destruct; no longer providing read or write permission or access to the register; releasing data disguised to look like the real register data while not releasing the real data; and combinations thereof. In an aspect, a flag bit is set in response to detecting unauthorized access to the register.

The method in an embodiment is preferably performed in hardware. In an aspect, the method further includes watching logical operations to detect a combination, and in response to detecting a combination releasing the contents of the register. The combination in an aspect includes an ordered sequence of write and/or read operations. In a further aspect, the method includes not releasing the contents of the register in response to the combination where logical operations detected unauthorized access to one or more registers. Detecting unauthorized access to the register file in an embodiment includes detecting at least one of the group consisting of watching for sequential memory access attempts, watching for attempts to access one or more registers using the wrong access mode or in the wrong sequence, watching for attempts to access one or more undocumented registers, and combinations thereof.

In a further embodiment a method of processing data in a logical system is disclosed that includes providing a secret, hidden, restricted or undocumented register; providing a dummy register; determining whether the dummy register is accessed; and triggering action in response to the dummy register being accessed. In an aspect, the triggering action includes at least one of the group consisting of interrupting the operations of the processor; causing the processor to shut-down, malfunction, lock, self-destruct; locking the contents of the register, no longer providing read or write permission or access to the register; releasing data disguised to look like the real register data while not releasing the real data; and combinations thereof. In an aspect, the method further includes setting a flag bit in response to accessing the dummy register.

A computer system for processing information in an embodiment is disclosed, where the computer system includes at least one processor having one or more register files, wherein at least one of the registers is a secret register not intended to be accessed by unauthorized users, wherein, the processor is configured and adapted to detect whether unauthorized access to the secret register is attempted; and to take evasive action in response to detecting attempts to access the secret register in an unauthorized manner. Taking evasive action in an aspect includes at least one of the group consisting of interrupting the operations of the processor; causing the processor to shut-down, malfunction, lock, or self destruct; locking the contents of the secret register; no longer providing read or write permission or access to the secret register; releasing data disguised to look like the real data in the secret register while not releasing the real data from the secret register; and combinations thereof. Detecting unauthorized attempts to access to the secret register includes detecting at least one of the group consisting of watching for sequential memory access attempts, watching for attempts to access one or more registers using the wrong access mode or in the wrong sequence, watching for attempts to access one or more undocumented registers, and combinations thereof.

The processor in an embodiment is further configured and adapted to watch logical operations to detect a combination that includes an ordered sequence of operations; and to release the contents of the secret register in response to detecting the combination, but not release the contents of the secret register in response to the combination where logical operations detected attempts at unauthorized access to the secret register. The system in a further aspect includes one or more dummy registers and the processor is further configured and adapted to determine if one or more of the dummy registers is accessed, and, in response to determining that at least one of the dummy registers was accessed, release data disguised to look like real data from the secret register while not releasing the real data from the secret register.

In a further embodiment, a computer system for processing information is disclosed where, the computer system includes at least one processor having one or more register files, wherein at least one of the registers is a secret register not intended to be accessed by unauthorized users; one or more computer readable non-transitory storage media; and programming instructions stored on the one or more computer readable non-transitory storage media for execution by the at least one processor, the programming instructions having programming instructions to detect whether unauthorized access to the secret register is attempted; and programming instructions to take evasive action in response to detecting attempted unauthorized access to the secret register. In an aspect, taking evasive action includes at least one of the group consisting of interrupting the operations of the processor; causing the processor to shut-down, malfunction, lock, or self-destruct; locking the contents of the secret register; no longer providing read or write permission or access to the secret register; releasing data disguised to look like the real data in the secret register while not releasing the real data from the secret register; and combinations thereof. In an aspect, detecting unauthorized access to the secret register includes detecting at least one of the group consisting of watching for sequential memory access attempts, watching for attempts to access one or more registers using the wrong access mode or in the wrong sequence, watching for attempts to access one or more undocumented registers, and combinations thereof.

The computer system in one or more embodiments further includes programing instructions to watch logical operations to detect a combination that includes an ordered sequence of operations; and further includes programming instructions to release the contents of the secret register in response to detecting the combination, but not releasing the contents of the secret register in response to the combination where logical operations detected unauthorized access to the secret register. In one or more aspects, the computer system has one or more dummy registers and programing instructions to determine when one or more of the dummy registers is accessed, and programming instructions to release data disguised to look like real data in the secret register while not releasing the real data from the secret register in response to accessing the dummy register.

While the illustrative embodiments described above are preferably implemented in hardware, such as in units and circuitry of a processor, for example logic circuits on a single chip, various aspects of the illustrative embodiments may be implemented in software as well. For example, it will be understood that each block of the flowchart illustration in FIGS. 5, 6, and 8, and combinations of blocks in the flowchart illustrations, can be implemented by logic circuits and/or computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

The hardware, logic circuits, functional units, and/or programs described herein are identified based upon the application and function for which they are implemented in a specific embodiment of the invention. However, it should be appreciated that any particular nomenclature herein is used merely for convenience, and thus the invention should not be limited to use solely in any specific application identified and/or implied by such nomenclature.

The flowchart and block diagrams in the figures illustrate the architecture, functionality, and operation of possible implementations of systems, methods, circuitry, logic circuits, and computer program products according to various embodiments of the present invention. In this regard, each block in the flowchart or block diagrams may represent a module, logic circuit, segment, or portion of code, and may comprise one or more circuits and/or executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems and/or logic circuits that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method of protecting against unauthorized attempts to access a register file on a processor, comprising:
   watching logical operations to detect unauthorized attempts to access the register file on the processor, wherein the register file comprises a plurality of entries and at least one of the plurality of register file entries includes at least one selected from a group consisting of a hidden register file entry, a secret register file entry, a restricted register file entry, an undocumented register file entry, and combinations thereof; and
   taking evasive action by the processor in response to detecting unauthorized attempts to access anyone of the hidden, secret, restricted, or undocumented register file entries,
   wherein watching logical operations to detect unauthorized attempts to access a register file on the processor comprises:
   watching logical operations to detect at least two access operations to the register file that are not performed in a pre-specified sequence; and
   taking the evasive action in response to detecting an attempt to access anyone of the hidden, secret, restricted, or undocumented register file entries without first performing the at least two access operations to the register file in the pre-specified sequence.

2. The method according to claim 1, wherein a flag bit is set in response to detecting unauthorized attempts to access any one of the hidden, secret, restricted or undocumented register file entries.

3. The method according to claim 1, wherein taking evasive action includes at least one selected from a group consisting of interrupting the operations of the processor, causing the processor to shut-down, malfunction, lock, self destruct, and combinations thereof.

4. The method according to claim 1, the method further comprises, locking, in response to detecting unauthorized attempts to access any one of the hidden, secret, restricted or undocumented register file entries, the contents of that register file entry.

5. The method according to claim 1, wherein the evasive action consists of no longer providing read or write permission or access to the hidden, secret, restricted, or undocumented register file entry.

6. The method according to claim 1, wherein the evasive action includes releasing data disguised to look like real register data while not releasing the real data held within the hidden, secret, restricted, or undocumented register file entry.

7. The method according to claim 1, wherein contents of the hidden, secret, restricted, or undocumented register file entry are released in response to detecting the at least two access operations to the register file performed in the pre-specified sequence.

8. The method according to claim 7, wherein the at least two access operations to the register file performed in the pre-specified sequence includes a pre-specified sequence of write and/or read operations that are not to adjacent register file entries.

9. The method according to claim 1, further comprising not releasing the contents of the hidden, secret, restricted, or undocumented register file entry in response to the at least two access to the register file operations performed in a pre-specified sequence where logical operations detected unauthorized access to one or more of the hidden, secret, restricted or undocumented register file entries before the at least two access operations to the register file are performed in the pre-specified sequence.

10. The method of claim 1, wherein detecting unauthorized access to any one of the hidden, secret, restricted, or undocumented register file entries includes detecting at least one selected from a group consisting of: watching for sequential access attempts to adjacent register file entries, watching for attempts to access one or more register file entries using the wrong access mode or in the wrong sequence, watching for attempts to access one or more undocumented registers, and combinations thereof.

11. A method of processing data in a logical system comprising:
   providing a register file on a processor, the register file having a plurality of entries;
   providing a secret, hidden, restricted or undocumented register file entry on the register file;
   providing at least two dummy register file entries on the register file, the at least two dummy register file entries located adjacent the secret, hidden, restricted, or undocumented register file entry in the register file;
   determining whether at least one of the at least two dummy register file entries is accessed; and
   triggering, in response to at least one of the at least two dummy register file entries being accessed, an action to protect the contents of the secret, hidden, restricted, or undocumented register file entry in the register file on the processor.

12. The method according to claim 11, wherein a flag bit is set in response to accessing one of the at least two dummy register file entries.

13. The method according to claim 11, wherein triggering an action in response to accessing the dummy register file entry includes at least one selected from a group consisting of interrupting the operations of the processor; causing the processor to shut-down, malfunction, lock, or self destruct; locking the contents of the secret, hidden, restricted, or undocumented register file entry, no longer providing read or write permission or access to the secret, hidden, restricted, or undocumented register file entry; releasing data disguised to look like real register data while not releasing the real data from the secret, hidden, restricted, or undocumented register file; and combinations thereof.

14. The method according to claim 11, further comprising watching logical operations to detect a combination, wherein the combination includes an ordered sequence of write and/or read operations; and releasing the contents of the secret, hidden, restricted or undocumented register file entry in response to detecting the combination.

15. The method according to claim 14, further comprising not releasing the contents of the secret, hidden, restricted, or undocumented register file entry in response to the combination where logical operations detected an attempt to access the dummy register file entry or the secret, hidden, restricted, or undocumented register file entry before detecting the combination.

16. A computer system for processing information, the computer system comprising:
   at least one processor having one or more register files, wherein at least one register file has one or more entries and at least one of the one or more register file entries is a secret register file entry not intended to be accessed by unauthorized users,
   wherein, the processor is configured and adapted to:
   detect whether unauthorized access to the secret register file entry is attempted; and
   take evasive action in response to detecting attempts to access the secret register file entry in an unauthorized manner,
   wherein detecting unauthorized access to the secret register file entry includes detecting at least one selected from a group consisting of: watching for sequential access attempts to the at least one register file having the secret register file entry; watching for attempts to access one or more register file entries of the at least one register file having the secret register file entry using the wrong access mode or in the wrong sequence; watching for attempts to access one or more undocumented register file entries; watching for attempts to access the secret register file entry before performing at least two access operations to the at least one register file having the secret register file entry in a pre-specified sequence that does not access adjacent register file entries; and combinations thereof; and
   wherein, taking evasive action includes at least one of a group consisting of: interrupting the operations of the processor; causing the processor to shut-down, malfunction, lock, or self destruct; locking the contents of the secret register file entry; no longer providing read or write permission or access to the secret register file entry; releasing data disguised to look like real data while not releasing the real data from the secret register file entry; and combinations thereof.

17. The computer system of claim 16, wherein the processor is further configured and adapted to:
   watch logical operations to detect a combination that includes at least two access operations performed to the at least one register file having the secret register file entry in a pre-specified sequence that does not access adjacent register file entries; and
   release the contents of the secret register file entry in response to detecting the combination, but not releasing the contents of the secret register file entry in response to the combination where logical operations detected unauthorized attempts to access the secret register file entry before operation of the combination.

18. The computer system of claim 16, wherein the system further comprises one or more dummy register file entries arranged adjacent to the location of the secret register file entry in the at least one register file and the processor is further configured and adapted to:

determine when one or more of the dummy register file entries are accessed, and release data disguised to look like real data while not releasing the real data from the secret register file entry in response to accessing the dummy register file entry.

* * * * *